(12) United States Patent
Akerele

(10) Patent No.: US 10,977,836 B2
(45) Date of Patent: Apr. 13, 2021

(54) COLOR WHEEL INTERFACE

(71) Applicant: L'Oreal, Paris (FR)

(72) Inventor: Dominic Akerele, Brooklyn, NY (US)

(73) Assignee: L'Oreal, Paris (FR)

( * ) Notice: Subject to any disclaimer, the term of this patent is extended or adjusted under 35 U.S.C. 154(b) by 6 days.

(21) Appl. No.: 16/528,254

(22) Filed: Jul. 31, 2019

(65) Prior Publication Data

US 2021/0035335 A1 Feb. 4, 2021

(51) Int. Cl.
*G06T 11/00* (2006.01)
*G06F 3/0482* (2013.01)
*G06F 3/0484* (2013.01)

(52) U.S. Cl.
CPC .......... *G06T 11/001* (2013.01); *G06F 3/0482* (2013.01); *G06F 3/04847* (2013.01); *G06T 2200/24* (2013.01)

(58) Field of Classification Search
CPC . G06T 11/001; G06T 2200/24; G06F 3/0482; G06F 3/04847
See application file for complete search history.

(56) References Cited

U.S. PATENT DOCUMENTS

| 5,924,426 A | * | 7/1999 | Galazin | A45D 44/005 |
| | | | | 132/200 |
| 2007/0140708 A1 | * | 6/2007 | Yonekawa | G03G 15/553 |
| | | | | 399/12 |
| 2009/0231356 A1 | * | 9/2009 | Barnes | G06F 3/04883 |
| | | | | 345/594 |
| 2018/0357695 A1 | * | 12/2018 | Wolff | G06Q 30/0621 |

OTHER PUBLICATIONS

International Search Report and Written Opinion dated Oct. 19, 2020, issued in corresponding International Application No. PCT/US2020/042142, filed Jul. 15, 2020, 11 pages.

* cited by examiner

*Primary Examiner* — Grace Q Li
(74) *Attorney, Agent, or Firm* — Christensen O'Connor Johnson Kindness PLLC

(57) ABSTRACT

Systems and methods for generating a color picker interface are provided. In some embodiments, information regarding available colors is retrieved by a color picker computing device, which generates a color picker interface based on the available colors. In some embodiments, the color picker interface allows a user to customize a color, but restricts the user to select colors that are available as indicated by the information regarding the available colors. In some embodiments, once a color is chosen using the color picker interface, the chosen color may be used to recommend one or more products based on the chosen color, to generate a virtual try-on image that shows a product associated with the chosen color rendered on an image of the user, or for any other purpose.

20 Claims, 5 Drawing Sheets

COLOR WHEEL INTERFACE

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a computer-implemented method of presenting a palette-specific color picker interface is provided. A computing device receives initialization information. The computing device retrieves palette information based on the initialization information. The computing device generates a color picker interface that includes one or more wedges based on the palette information. The computing device presents the color picker interface. The computing device receives one or more selections within the one or more wedges of the color picker interface. The computing device determines a hue based on the one or more selections within the one or more wedges of the color picker interface.

In some embodiments, a computing device is provided. The computing device is configured to receive initialization information; retrieve palette information based on the initialization information; generate a color picker interface that includes one or more wedges based on the palette information; present the color picker interface; receive one or more selections within the one or more wedges of the color picker interface; and determine a hue based on the one or more selections within the one or more wedges of the color picker interface.

In some embodiments, a system is provided. The system comprises a color picker generation engine and a user interface engine. The color picker generation engine includes computational circuitry configured to receive initialization information; retrieve palette information based on the initialization information; and generate a color picker interface that includes one or more wedges based on the palette information. The user interface engine includes computational circuitry configured to present the color picker interface; receive one or more selections within the one or more wedges of the color picker interface; and determine a hue based on the one or more selections within the one or more wedges of the color picker interface.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Many solutions exist for allowing a user to select a custom color. Such interfaces, often called "color wheel" or "color picker" interfaces, usually allow a user to select colors from across a color spectrum. While such solutions may be useful for graphic design or other situations in which any color in a color spectrum is available, it is less useful in situations where a limited number of colors are available. In such situations, unconstrained choices in a color spectrum may result in a color being chosen that is not available. That said, users enjoy the flexibility of being able to configure colors to closely match their desires, even if they have to operate within some constraints.

One particular situation in which the desire of consumers to select highly specific colors despite a limited number of color options is in the area of cosmetics. Typically, a cosmetic producer will create a product line that has a limited number of shades. Even if a product is provided that allows a user to generate a custom color (e.g., by mixing custom amounts of various monochrome colorants), the selections of colorant amounts may be limited in order to retain a palette associated with a brand identity, or to compensate for limitations of a compounding device. Improved color picker interfaces are desired that can provide a customizable selection of a color while still working within constraints related to what colors are possible to be created.

Figure 1:
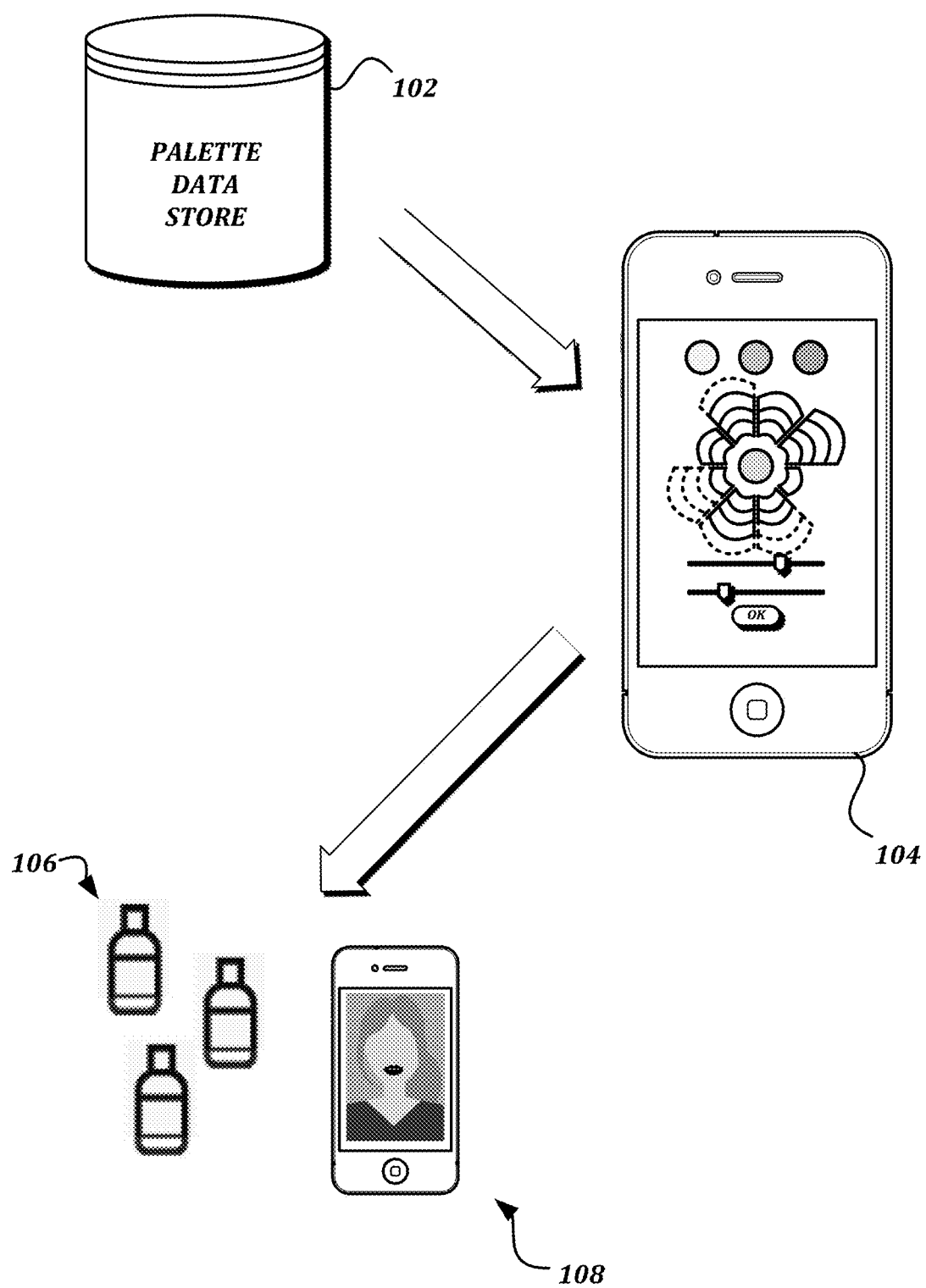
FIG. 1 is a schematic diagram that illustrates a non-limiting example embodiment of a system for generating and using an improved color wheel interface according to various aspects of the present disclosure.

FIG. 1 is a schematic diagram that illustrates a non-limiting example embodiment of a system for generating and using an improved color wheel interface according to various aspects of the present disclosure. In the illustrated embodiment, a palette data store 102 stores information regarding available colors. For example, the palette data store 102 may store a first set of available colors that are related to a first palette, and a second set of available colors that are related to a second palette. The available colors may be stored as composed colors, or may be stored as available units of colorants that can be combined with each other to create custom colors within a given palette.

The information regarding available colors is transmitted to a color picker computing device 104. The transmission may be via any suitable communication technology, including but not limited to wired technologies that include but are not limited to Ethernet, USB, and FireWire; and wireless technologies that include but are not limited to Wi-Fi, Wi-MAX, 2G, 3G, 4G, 5G, LTE, Bluetooth, and near-field communication (NFC). The transmission may traverse portions of the Internet.

The color picker computing device 104 uses the information regarding available colors to generate and present a color picker interface. The color picker interface allows a user to customize a color, but restricts the user to select colors that are available as indicated by the information regarding available colors. Once a color is chosen using the color picker interface, the chosen color may be used to recommend one or more products 106 based on the chosen color, to generate a virtual try-on image that shows a product associated with the chosen color rendered on an image of the user, or for any other purpose.

Figure 2:
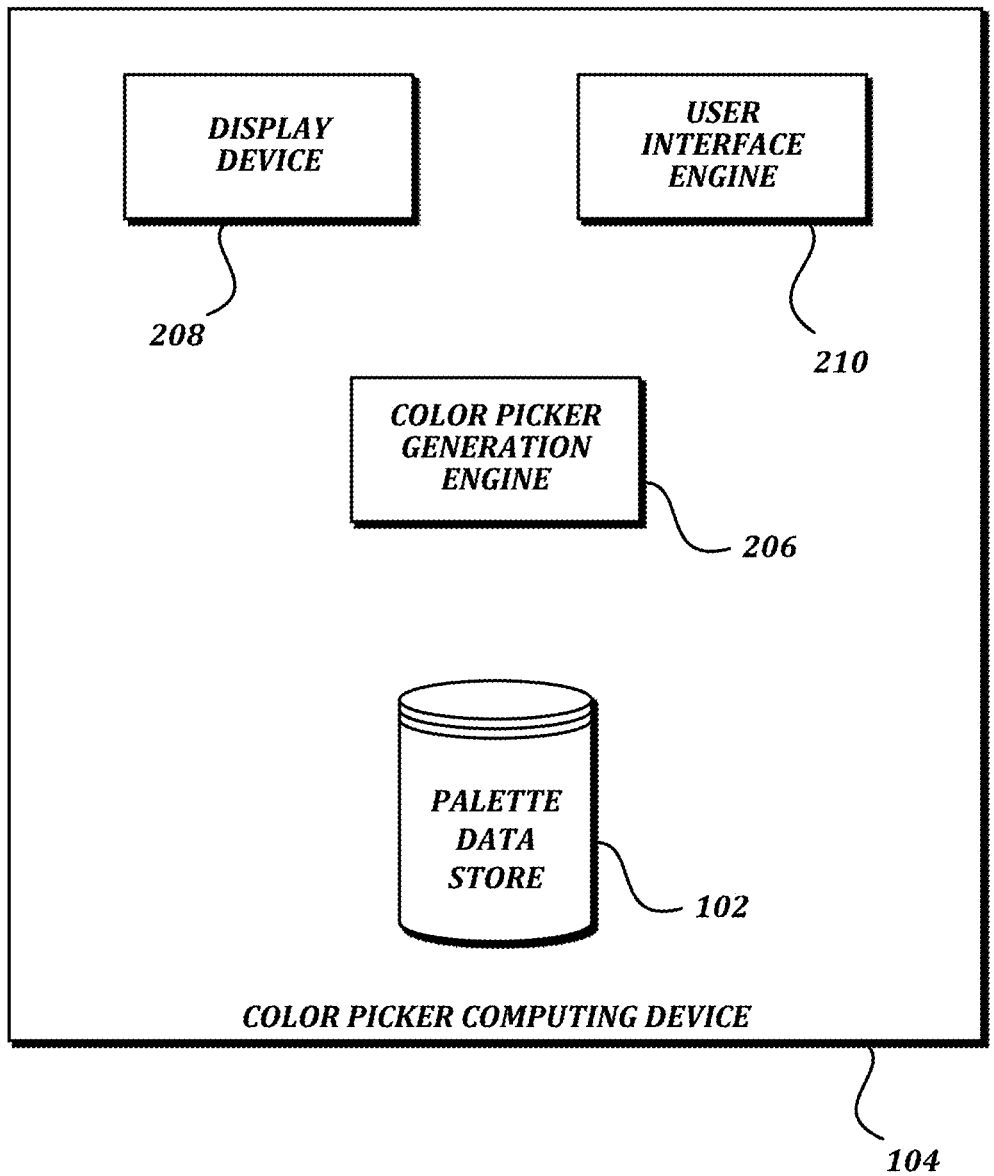
FIG. 2 is a block diagram that illustrates a non-limiting example embodiment of a color picker computing device according to various aspects of the present disclosure.

FIG. 2 is a block diagram that illustrates a non-limiting example embodiment of a color picker computing device according to various aspects of the present disclosure. In some embodiments, the color picker computing device 104 may be a mobile computing device such as a smartphone or tablet computing device, a desktop computing device, a laptop computing device, or any other type of computing device that can be configured to include the components described as part of the color picker computing device 104.

As shown, the color picker computing device 104 includes a display device 208, a user interface engine 210, and a color picker generation engine 206.

In some embodiments, the display device 208 is an LED display, an OLED display, or another type of display for presenting a user interface. In some embodiments, the display device 208 may be combined with or include a touch-sensitive layer, such that a user may interact with a user interface presented on the display device 208 by touching the display. In some embodiments, a separate user interface device, including but not limited to a mouse, a keyboard, or a stylus, may be used to interact with a user interface presented on the display device 208. In some embodiments, the user interface engine 210 is configured to present a user interface on the display device 208, including forms for collecting information from the user, and also including color picker interfaces generated by the color picker generation engine 206. In some embodiments, the color picker generation engine 206 is configured to generate color picker interfaces based on information retrieved from the palette data store 102 and/or information collected by the user interface engine 108, and is configured to provide the color picker interfaces to the user interface engine 210 for presentation. Further details regarding these components are provided below.

In general, the word "engine," as used herein, refers to logic embodied in hardware or software instructions, which can be written in a programming language, such as C, C++, COBOL, JAVA™, PHP, Perl, HTML, CSS, JavaScript, VBScript, ASPX, Microsoft.NET™, and/or the like. An engine may be compiled into executable programs or written in interpreted programming languages. Software engines may be callable from other engines or from themselves. Generally, the engines described herein refer to logical modules that can be merged with other engines, or can be divided into sub-engines. The engines can be stored in any type of computer-readable medium or computer storage device and be stored on and executed by one or more general purpose computers, thus creating a special purpose computer configured to provide the engine or the functionality thereof.

In some embodiments, the color picker computing device 104 includes the palette data store 102. As discussed above, the palette data store 102 may include information regarding available colors associated with one or more palettes. In some embodiments, the palette data store 102 may be provided by the color picker computing device 104 as illustrated. In some embodiments, the palette data store 102 may be provided by a separate computing device or by multiple separate computing devices, and may be accessed by the color picker computing device 104 via a network.

As understood by one of ordinary skill in the art, a "data store" as described herein may be any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, as described further below. One of ordinary skill in the art will recognize that separate data stores described herein may be combined into a single data store, and/or a single data store described herein may be separated into multiple data stores, without departing from the scope of the present disclosure.

In FIG. 2, the color picker computing device 104 is illustrated as a single computing device. In some embodiments, the functionality of the color picker computing device 104 may be split between multiple computing devices instead of being present in a single computing device as illustrated. For example, as mentioned above, in some embodiments the palette data store 102 may be provided by one or more other computing devices instead of by the color picker computing device 104. As another example, the display device 208 may be located on a first computing device, while the user interface engine 210 and color picker generation engine 206 may be located on a second computing device. In other embodiments, the display device 208, user interface engine 210, color picker generation engine 206 and palette data store 102 may be provided by some other combination of computing devices. If the functionality of the color picker computing device 104 is provided by more than one computing device, then the computing devices that collectively provide the functionality of the color picker computing device 104 may communicate with each other using any suitable wired or wireless communication technology.

Figure 3:
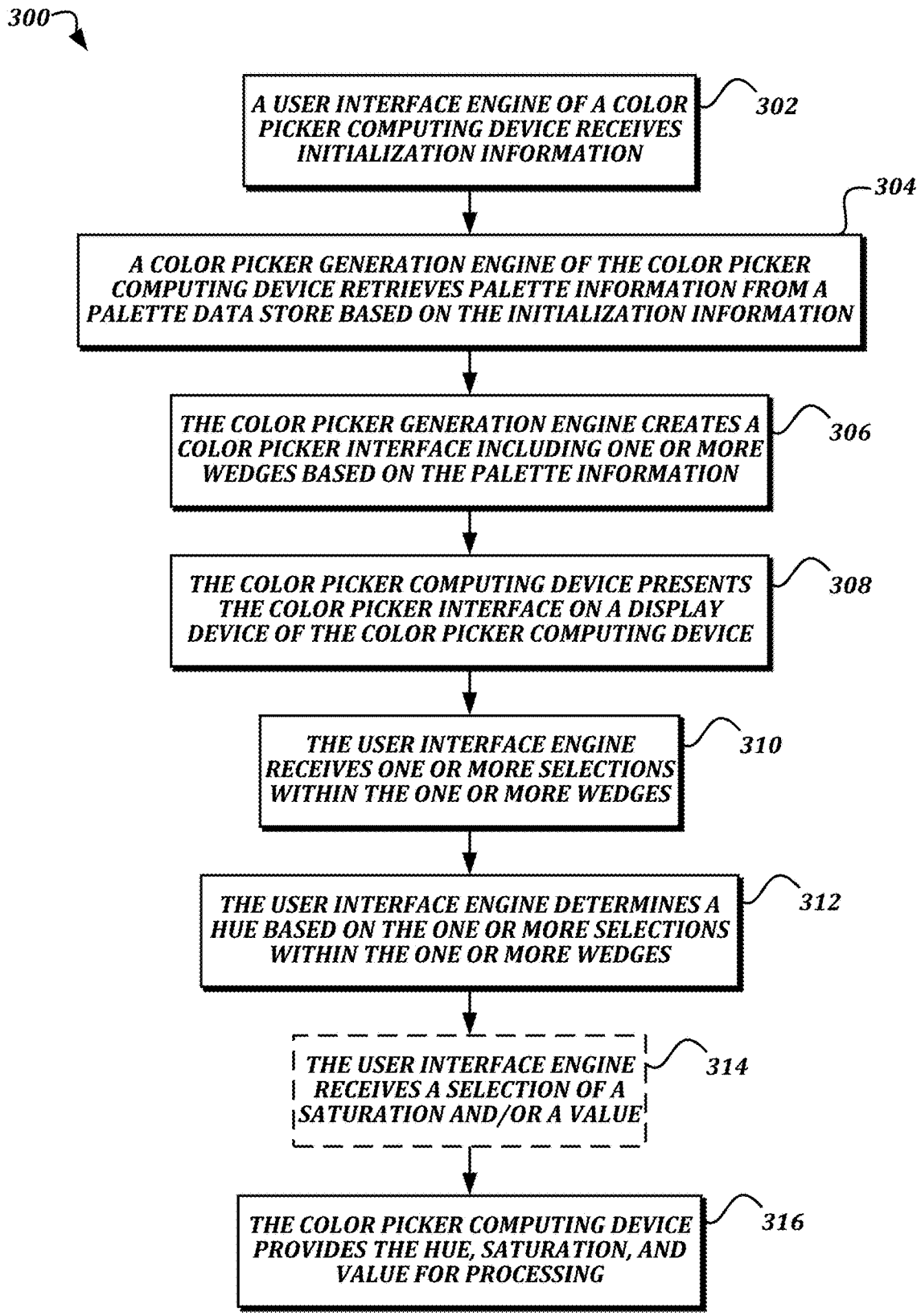
FIG. 3 is a flowchart that illustrates a non-limiting example embodiment of a method of generating and using an improved color picker interface according to various aspects of the present disclosure.

FIG. 3 is a flowchart that illustrates a non-limiting example embodiment of a method of generating and using an improved color picker interface according to various aspects of the present disclosure. In the method 300, the color picker computing device 104 creates a color picker interface based on initialization information and palette information retrieved from the palette data store. The color picker interface is then used by the user to select a color, and the selected color is provided for processing.

At block 302, a user interface engine 210 of a color picker computing device 104 receives initialization information. The initialization information may be any suitable information that can help identify either a starting color to be used to pick a palette from the palette data store 102, or to directly pick a palette from the palette data store 102. Some non-limiting examples of initialization information include an indication of a skin tone, an indication of a skin undertone, an indication of a product from a palette, a social media post that includes or mentions a product from a palette, and an identification of a palette itself. An indication of a product or a palette may include a brand name of the product or palette, a color name of a product, a bar code of the product or palette, or any other type of identifier of the product or palette.

At block 304, a color picker generation engine 206 of the color picker computing device 104 retrieves palette information from a palette data store 102 based on the initialization information. If the initialization information includes an identification of the palette itself, the color picker generation engine 206 may simply query the palette data store 102 for the requested palette. If the initialization information indicates a product, the color picker generation engine 206 may use the palette data store 102 to determine a palette that includes the product or is associated with the product, and to thereafter retrieve palette information for the determined palette. If the initialization information indicates a skin tone, a skin undertone, or other color information, the color picker generation engine 206 may determine a palette that complements the indicated skin tone, skin undertone, or other color information based on information in the palette data store 102, and may thereafter retrieve palette information for the determined palette.

In some embodiments, the palette information may include information that indicates available options for color combinations that are associated with a given palette. For example, for style purposes, a given palette may be biased toward red and yellow shades as opposed to blue or green shades. As such, the palette may limit the amount of blue or green colorant ingredients that may be added to a combined product, and may allow as much red or yellow colorant ingredients as desired. As another example, a given product formulation may have a limited number of colorant ingredient selections. That is, while one palette may include colorants for white, red, yellow, black, and blue, another palette may include more colorants (such as orange or green) or fewer colorants.

At block 306, the color picker generation engine 206 creates a color picker interface including one or more wedges based on the palette information. In some embodiments, a wedge may be included in the color picker interface for each colorant that is included in the palette that may be adjusted by the user. In some embodiments, a size of the wedge may be determined based on an amount of adjustability for the colorant associated with the wedge.

Figure 4:
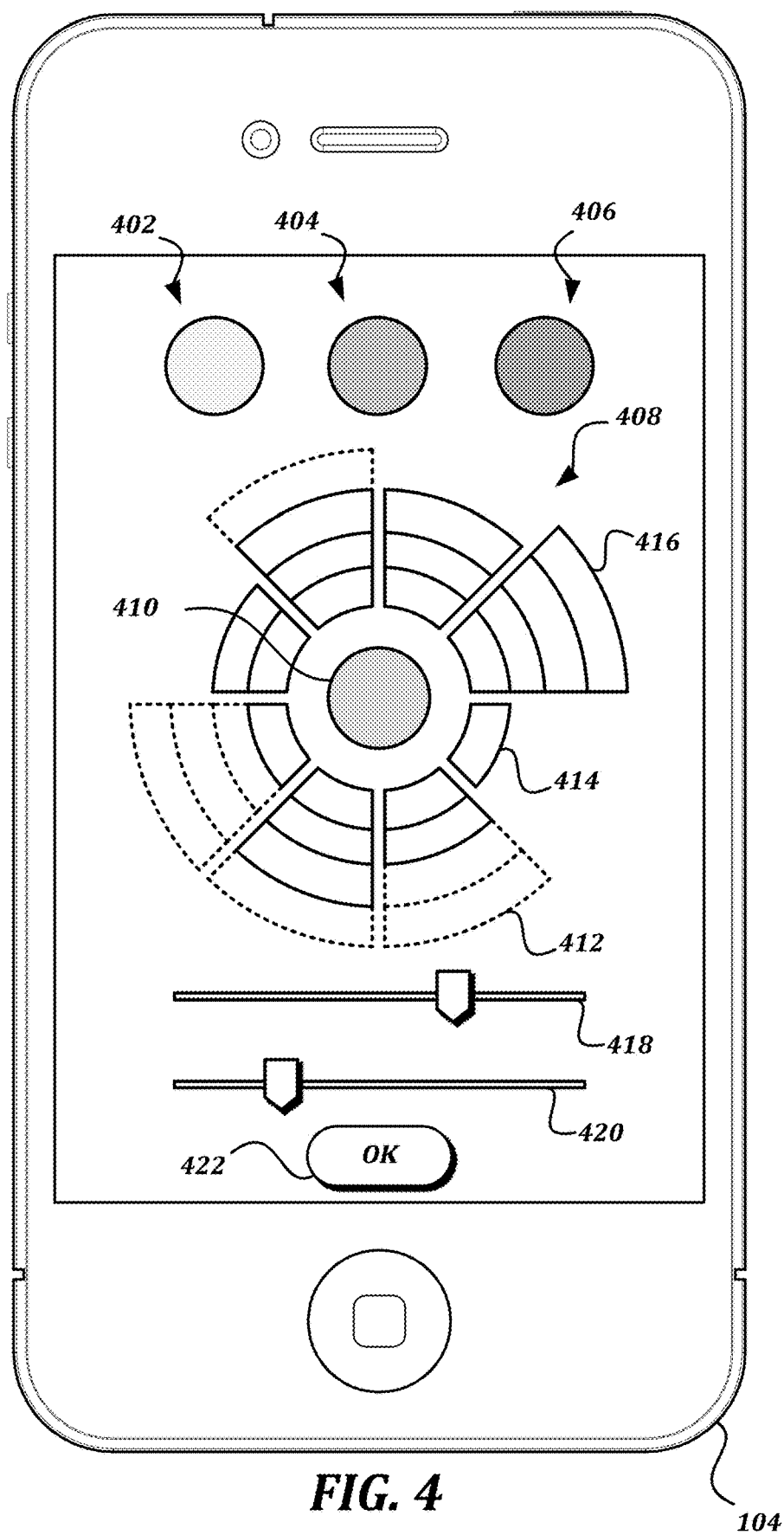
FIG. 4 illustrates a non-limiting example embodiment of a color picker computing device presenting a color picker interface according to various aspects of the present disclosure.

FIG. 4 illustrates a non-limiting example embodiment of a color picker computing device presenting a color picker interface according to various aspects of the present disclosure. As shown, the color picker interface 408 includes a plurality of wedges, including a first wedge 416 associated with a first colorant, a second wedge 414 associated with a second colorant, and a third wedge 412 associated with a third colorant. Each of the wedges of the plurality of wedges is associated with a different colorant of the given palette. In some embodiments, each wedge may be filled with a color of the associated colorant.

Each wedge 416, 414, 412 includes one or more segments, and the number of segments present in the wedge indicates the adjustability of that colorant in the palette. For example, the first wedge 416 and the third wedge 412 include four segments that extend radially from the center of the color picker interface 408 to the edge of the color picker interface 408. Accordingly, the first wedge 416 and the third wedge 412 provide maximum adjustability for the first colorant and the third colorant, respectively. The second wedge 414 includes a single segment, indicating that while the second colorant may be either included or excluded from the selected color, it is not adjustable further.

Returning to FIG. 3, at block 308, the color picker computing device 104 presents the color picker interface on a display device 208 of the color picker computing device 104. In some embodiments, the color picker interface may include the wedges discussed above, along with other interface elements to facilitate use of the color picker interface. As shown in FIG. 4, the color picker computing device 104 is presenting the color picker interface 408, and also a chosen color display 410, a plurality of starting colors 402, 404, 406, two sliders 418, 420, and a confirmation interface element 422. In some embodiments, the chosen color display 410 may be configured to present the combined color that is created based on the selections within the wedges. In some embodiments, the plurality of starting colors 402, 404, 406 may, upon receiving an interaction from the user, cause the color picker interface 408 to be configured to generate the associated starting color. That is, the appropriate wedge segments may be selected that would result in the starting color being generated, and the chosen color display 410 may change to the starting color. In some embodiments, the sliders 418, 420 may be used to configure aspects of the product other than a shade generated by the color picker interface 408, as discussed in further detail below. In some embodiments, the confirmation interface element 422 may confirm the selection of the color as currently configured within the color picker interface 408. In some embodiments, more or fewer interface elements may be presented by the color picker computing device 104 along with the color picker interface 408.

Returning again to FIG. 3, at block 310, the user interface engine 210 receives one or more selections within the one or more wedges. In the embodiment illustrated in FIG. 4, solid wedge segments indicate wedge segments that have been selected by the user, and dashed-line wedge segments indicate wedge segments that can be selected by the user but have not been. In other words, the first wedge 416 indicates that the user has selected a maximum amount of the first colorant by virtue of the fact that all of the wedge segments are in solid line, and the third wedge 412 indicates that the user has selected half of the available amount of the third colorant by virtue of the fact that two of the wedge segments are in solid line and two of the wedge segments are in dotted line. In some embodiments, the wedge segments of different wedges may be of different sizes, thereby indicating higher or lower levels of granularity for selection of the different colorants. To select a different amount of a colorant, the user may tap on a wedge segment within the color picker interface 408.

Returning to FIG. 3, at block 312, the user interface engine 210 determines a hue based on the one or more selections within the one or more wedges. As discussed above, the hue may be determined based on the amounts of colorants indicated by the selections of wedge segments of the color picker interface 408.

At optional block 314, the user interface engine 210 receives a selection of a saturation and/or a value. In some embodiments, the wedges of the color picker interface 408 may only relate to hue, and the saturation (intensity of the hue based on the removal or addition of black, white, or grey) and value (lightness or darkness of the hue based on the removal or addition of black or white) of the resulting color may be determined based on the sliders 418, 420 (FIG. 4), or by using any other suitable interface elements for providing a saturation and value. Block 314 is illustrated as optional because, in some embodiments, saturation and/or value may be represented within the wedges of the color picker interface 408, and separate selections of saturation and/or value may not be collected.

At block 316, the color picker computing device 104 provides the hue, saturation, and value for processing. In some embodiments, the processing may include determining an existing cosmetic product of the chosen color, and providing the product for purchase or testing. In some embodiments, the processing may include compounding a custom cosmetic product of the chosen color. In some embodiments, the processing may include generating an augmented reality presentation of an image or video of the user wearing a cosmetic product of the chosen color. In some embodiments, the processing may include any other use for which the chosen color may be useful.

The method 300 described above relates to using the color picker interface to select a color in the HSV color space. In some embodiments, a similar interface may be used to select a color in any other color space, such as any of the HSL, RGB, CMYK, YUV, YPbPr, TSL, or CIELAB color spaces. Further, a similar interface (or additional interface controls such as sliders) may be provided to specify other characteristics of a product, such as a level of gloss or an SPF value.

Figure 5:
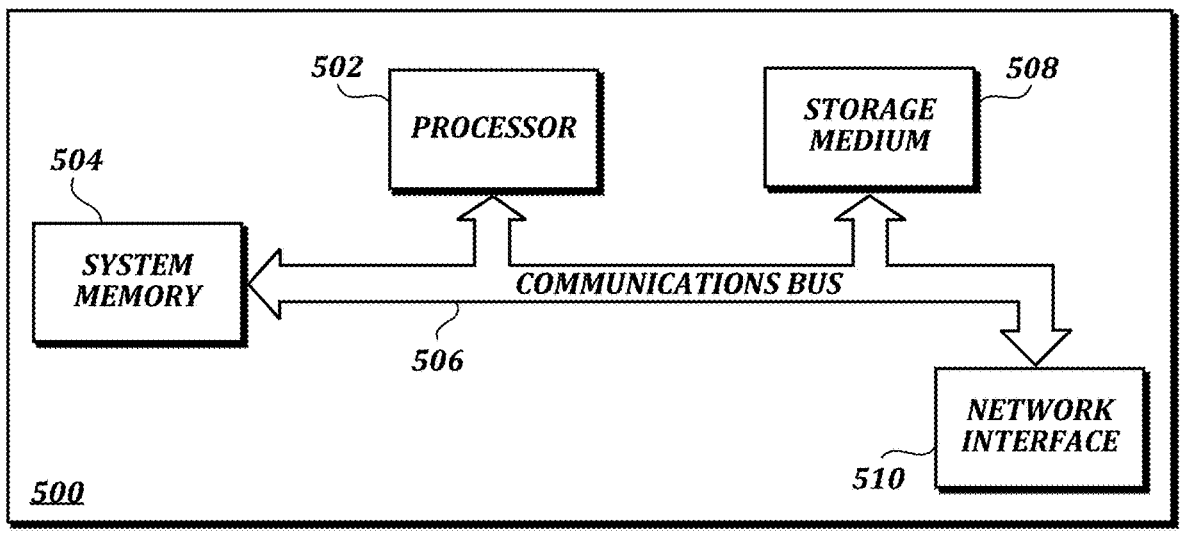
FIG. 5 is a block diagram that illustrates aspects of an exemplary computing device appropriate for use as a computing device of the present disclosure.

FIG. 5 is a block diagram that illustrates aspects of an exemplary computing device 500 appropriate for use as a computing device of the present disclosure. While multiple different types of computing devices were discussed above, the exemplary computing device 500 describes various elements that are common to many different types of computing devices. While FIG. 5 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 500 may be any one of any number of currently available or yet to be developed devices.

In its most basic configuration, the computing device 500 includes at least one processor 502 and a system memory 504 connected by a communication bus 506. Depending on the exact configuration and type of device, the system memory 504 may be volatile or nonvolatile memory, such as read only memory ("ROM"), random access memory ("RAM"), EEPROM, flash memory, or similar memory technology. Those of ordinary skill in the art and others will recognize that system memory 504 typically stores data and/or program modules that are immediately accessible to and/or currently being operated on by the processor 502. In this regard, the processor 502 may serve as a computational center of the computing device 500 by supporting the execution of instructions.

As further illustrated in FIG. 5, the computing device 500 may include a network interface 510 comprising one or more components for communicating with other devices over a network. Embodiments of the present disclosure may access basic services that utilize the network interface 510 to perform communications using common network protocols. The network interface 510 may also include a wireless network interface configured to communicate via one or more wireless communication protocols, such as WiFi, 2G, 3G, LTE, WiMAX, Bluetooth, Bluetooth low energy, and/or the like. As will be appreciated by one of ordinary skill in the art, the network interface 510 illustrated in FIG. 5 may represent one or more wireless interfaces or physical communication interfaces described and illustrated above with respect to particular components of the system 100.

In the exemplary embodiment depicted in FIG. 5, the computing device 500 also includes a storage medium 508. However, services may be accessed using a computing device that does not include means for persisting data to a local storage medium. Therefore, the storage medium 508 depicted in FIG. 5 is represented with a dashed line to indicate that the storage medium 508 is optional. In any event, the storage medium 508 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 504 and storage medium 508 depicted in FIG. 5 are merely examples of computer-readable media.

Suitable implementations of computing devices that include a processor 502, system memory 504, communication bus 506, storage medium 508, and network interface 510 are known and commercially available. For ease of illustration and because it is not important for an understanding of the claimed subject matter, FIG. 5 does not show some of the typical components of many computing devices. In this regard, the computing device 500 may include input devices, such as a keyboard, keypad, mouse, microphone, touch input device, touch screen, tablet, and/or the like. Such input devices may be coupled to the computing device 500 by wired or wireless connections including RF, infrared, serial, parallel, Bluetooth, Bluetooth low energy, USB, or other suitable connections protocols using wireless or physical connections. Similarly, the computing device 500 may also include output devices such as a display, speakers, printer, etc. Since these devices are well known in the art, they are not illustrated or described further herein.

While illustrative embodiments have been illustrated and described, it will be appreciated that various changes can be made therein without departing from the spirit and scope of the invention.

The embodiments of the invention in which an exclusive property or privilege is claimed are defined as follows:

1. A computer-implemented method of presenting a palette-specific color picker interface, the method comprising:
   receiving, by a computing device, initialization information;
   retrieving, by the computing device, palette information based on the initialization information, wherein the palette information includes indications of a plurality of colorants associated with a palette and adjustability of each colorant within the palette;
   generating, by the computing device, a color picker interface that includes a plurality of wedges based on the palette information, wherein each wedge is associated with a colorant of the plurality of colorants, and wherein each wedge includes a number of segments based on the adjustability of the associated colorant within the palette;
   presenting, by the computing device, the color picker interface;
   receiving, by the computing device, one or more selections of segments within the one or more wedges of the color picker interface that indicate amounts of the associated colorants; and
   determining, by the computing device, a hue based on the indicated amounts of the associated colorants.

2. The method of claim 1, wherein the palette information further includes indications of available amounts of one or more colorants associated with the palette.

3. The method of claim 2, wherein a size of each wedge is based on the available amount of the associated colorant.

4. The method of claim 1, wherein receiving initialization information includes receiving an indication of at least one of a skin tone, an undertone, a social media post, and a palette.

5. The method of claim 1, further comprising:
generating a virtual depiction of a user wearing a product having the hue; and
presenting the virtual depiction of the user on a display device of the computing device.

6. The method of claim 1, further comprising transmitting, by the computing device, the hue to a compounding device to compound a product based on the hue.

7. The method of claim 1, further comprising receiving, by the computing device, a selection of at least one of a saturation and a value.

8. A computing device configured to:
receive initialization information;
retrieve palette information based on the initialization information, wherein the palette information includes indications of a plurality of colorants associated with a palette and adjustability of each colorant within the palette;
generate a color picker interface that includes a plurality of wedges based on the palette information, wherein each wedge is associated with a colorant of the plurality of colorants, and wherein each wedge includes a number of segments based on the adjustability of the associated colorant within the palette;
present the color picker interface;
receive one or more selections of segments within the one or more wedges of the color picker interface that indicate amounts of the associated colorants; and
determine a hue based on the indicated amounts of the associated colorants.

9. The computing device of claim 8, wherein the palette information further includes indications of available amounts of one or more colorants associated with the palette.

10. The computing device of claim 9, wherein a size of each wedge is based on the available amount of the associated colorant.

11. The computing device of claim 8, wherein receiving initialization information includes receiving an indication of at least one of a skin tone, an undertone, a social media post, and a palette.

12. The computing device of claim 8, further configured to:
generate a virtual depiction of a user wearing a product having the hue; and
present the virtual depiction of the user on a display device of the computing device.

13. The computing device of claim 8, further configured to transmit the hue to a compounding device to compound a product based on the hue.

14. The computing device of claim 8, further configured to receive a selection of at least one of a saturation and a value.

15. A system, comprising:
a color picker generation engine including computational circuitry configured to:
receive initialization information;
retrieve palette information based on the initialization information, wherein the palette information includes indications of a plurality of colorants associated with a palette and adjustability of each colorant within the palette; and
generate a color picker interface that includes a plurality of wedges based on the palette information, wherein each wedge is associated with a colorant of the plurality of colorants, and wherein each wedge includes a number of segments based on the adjustability of the associated colorant within the palette;
a user interface engine including computational circuitry configured to:
present the color picker interface; and
receive one or more selections of segments within the one or more wedges of the color picker interface that indicate amounts of the associated colorants; and
determine a hue based on the indicated amounts of the associated colorants.

16. The system of claim 15, wherein the palette information further includes indications of available amounts of one or more colorants associated with the palette, and a size of each wedge is based on the available amount of the associated colorant.

17. The system of claim 15, wherein receiving initialization information includes receiving an indication of at least one of a skin tone, an undertone, a social media post, and a palette.

18. The system of claim 15, wherein the computational circuitry of the user interface engine is further configured to:
generate a virtual depiction of a user wearing a product having the hue; and
present the virtual depiction of the user on a display device.

19. The system of claim 15, wherein the computational circuitry of the user interface engine is further configured to transmit the hue to a compounding device to compound a product based on the hue.

20. The system of claim 15, wherein the computational circuitry of the user interface engine is further configured to receive a selection of at least one of a saturation and a value.

\* \* \* \* \*